United States Patent [19]

Bradshaw et al.

[11] Patent Number: 4,539,854
[45] Date of Patent: Sep. 10, 1985

[54] FRICTION DRIVE FOR METERING DEVICE

[75] Inventors: Randolph F. Bradshaw, Avon; Glen A. Carey, North Ridgeville, both of Ohio

[73] Assignee: Corning Glass Works, Corning, N.Y.

[21] Appl. No.: 541,511

[22] Filed: Oct. 13, 1983

[51] Int. Cl.³ .......................... B01L 3/02; G01N 1/14
[52] U.S. Cl. ................. 73/864.18; 73/864.24; 74/202; 74/206; 422/100
[58] Field of Search ............ 73/432 B, 864.01, 864.13, 73/864.16, 864.17, 864.18, 864.24; 74/89, 202, 206, 207; 604/154, 155, 208–211, 224; 422/100

[56] References Cited

U.S. PATENT DOCUMENTS

| | | | |
|---|---|---|---|
| 2,264,620 | 12/1941 | Conrad | 74/206 |
| 2,439,485 | 4/1948 | Porter | 74/206 X |
| 2,540,738 | 2/1951 | Kaplowitz | 74/206 |
| 3,232,128 | 2/1966 | Randolph et al. | 74/207 X |
| 3,364,760 | 1/1968 | Bugg | 74/206 |
| 3,436,972 | 4/1969 | Small | 74/89 |
| 3,735,902 | 5/1973 | Zindler | 73/864.16 X |
| 3,915,651 | 10/1975 | Nishi | 73/864.16 |
| 4,038,874 | 8/1977 | Baldin et al. | 73/864.16 |
| 4,226,128 | 10/1980 | Dellantonio | 74/89 X |
| 4,250,763 | 2/1981 | Dangschat | 74/202 X |
| 4,274,453 | 6/1981 | Lee | 73/864.24 X |
| 4,296,648 | 10/1981 | Okano et al. | 74/206 X |
| 4,378,709 | 4/1983 | Chitayat | 74/89 X |
| 4,406,170 | 9/1983 | Kuhn | 73/864.16 |
| 4,470,317 | 9/1984 | Sabloewski et al. | 73/864.16 |

Primary Examiner—Robert H. Spitzer
Attorney, Agent, or Firm—B. D. Voyce

[57] ABSTRACT

In a fluid metering system, a plunger actuated syringe is coupled to at least one source of fluid, and a highly accurate friction drive is coupled to the plunger for moving fluid to a delivery outlet. The friction drive has a rack having a flat side and a rotatable circular drive shaft, or pinion, pressed against the flat side of the rack for moving the same by friction. Opposed guide rollers engage the rack in opposition to the flat side in straddling relation with the pinion for urging the rack thereagainst. A moveable swing arm supports one of the guide rollers against the rack. A spring leverages the swing arm and guide roller against the rack and transmits the force to the pinion. A positioning rod is provided for securing the swing arm and the moveable guide roller in a plane perpendicular to the flat side of the rack to prevent lateral motion of the rack and pinion whereby inaccuracies in the system may be minimized.

14 Claims, 3 Drawing Figures

FRICTION DRIVE FOR METERING DEVICE

BACKGROUND OF THE INVENTION

The present invention relates to a highly accurate and precise linear friction drive for a dosage metering device particularly adapted for operating syringes or pipetters. In particular, the invention comprises a drive shaft and a circular drive shaft. The driven shaft has a flat side pressed against the drive shaft. When the drive shaft is rotated, the driven shaft is moved by friction and with negligible slip. The driven shaft and the drive shaft are analogous to a toothless rack and pinion set. The rack is rollably mounted on a set of guide rollers opposed to and straddling the pinion. One of the guide rollers is fixed, and one is moveable. The latter is mounted on a spring-loaded swing arm providing mechanical advantage. A force exerted against the swing arm is multiplied and transferred to the pinion via the rack.

In instruments useful for the automatic analysis of physiological fluids and the like, small quantities of such fluids are diluted with relatively large quantities of reagents. These devices accurately aspirate physiological fluids and reagents by means of a plunger-driven syringe and deliver the materials by means of communicating tubing terminated in a pipetting tip into a receptacle such as a dilution cup. For a variety of reasons, it is important that the proportions of physiological fluid and reagents be accurate. One obvious reason is that the chemical analysis will change if the proportions of the physiological fluid and reagents are not consistent.

Instruments used for the purposes described above are known. For the most part, such instruments use belt or gear drives for actuating the plunger. Such drives normally have means for positively stopping the motion of the plunger, for example, a mechanical stop. Although reasonably satisfactory for measuring selected incremental values of reagents, such systems do not have flexibility, nor are they as accurate and precise and is now achievable by means of the present invention.

Gear drives may be substituted for the belt drive mentioned above. However, even the most accurate gears, sometimes referred to as antibacklash gears, suffer from what is known as cyclical error. Although the maximum value of such error is very small, it is not consistently the same. It varies over the cycle of gear movement. At one time in the cycle cyclical error may be 0.1%, and another time it may be as high as 5%. The problem is that one cannot correct for the variation in the error. Further, errors are disproportionate. If one wished to mix two measures of liquid, for example, 5 $\mu$l and 200 $\mu$l, a 0.5 $\mu$l error relative to the smaller quantity of liquid would be 10%. The same error with respect to the larger quantity would amount to only 0.5%. Thus, the error in the smaller amount is 20 times larger than the error in the larger amount.

It has been found that the use of a friction drive, analogous to a toothless rack and pinion, results in a proportionate, linear error. In other words, any motion of the rack relative to the pinion results in the same percentage of error. If the example above, if a 5 $\mu$l sample were to be mixed with a 200 $\mu$l sample, each might see an error of 1%. Thus, because the error percentage is the same, the proportional relationship between the two amounts remains about the same. Because the error is linear, it is predictable and it may be corrected by simple calculation.

Friction drives have been rejected in the past because they slip. In particular, the prior art friction drives focused on high power levels with significant slip. The present invention provides means for minimizing the slip and other sources of error, especially cyclically varying errors, in order to produce a highly accurate and precise linear fluid metering system.

The relative ease with which parts move with respect to each other is sometimes referred to as mechanical slop. In a machine designed for accuracy, mechanical slop introduces errors. The moving parts, hereinafter described, are stiffly mounted to prevent mechanical slop. For example, the moveable guide roller and swing arm are secured for preventing lateral deflection of the guide roller and rack supported thereby. The guide rollers are double row, angular, preloaded, radial ball bearings of a known kind. They have working surfaces (not shown) in opposition for resisting lateral motion of the guide roller in relation to its mounting. Accuracy of the present invention is enhanced because slop is reduced.

The present invention utilizes a digital stepping motor governed by a pulse width modulation control system. The digital stepping motor drives the pinion in very small steps so that accurate positioning of the rack may be achieved. Thus, fixed incremental stops and the consequent lack of flexibility are eliminated because the rack may be positioned in virtually any location.

SUMMARY OF THE INVENTION

The present invention provides a fluid metering system wherein a plunger actuated syringe is coupled to at least one source of fluid, and a highly accurate and precise linear friction drive is coupled to the plunger for moving fluid to a delivery outlet. The friction drive comprises a rack having a flat side and a rotatable circular drive shaft, or pinion, pressed against the flat side of the rack for moving the same by friction. Opposed guide rollers engage the rack in opposition to the flat side and in straddling relation with the pinion for urging the rack thereagainst. A moveable swing arm, having one end mounted for rotation about a fixed point, supports one of the guide rollers against the rack. A force exerting means operating at the free end of the swing arm leverages the guide roller against the rack and transmits the force to the pinion. Means is provided for securing the swing arm and the moveable guide roller in a plane perpendicular to the flat side of the rack to thereby prevent lateral motion of the rack in relation to the pinion whereby inaccuracies in the system may be minimized.

DESCRIPTION OF THE INVENTION

Figure 1:
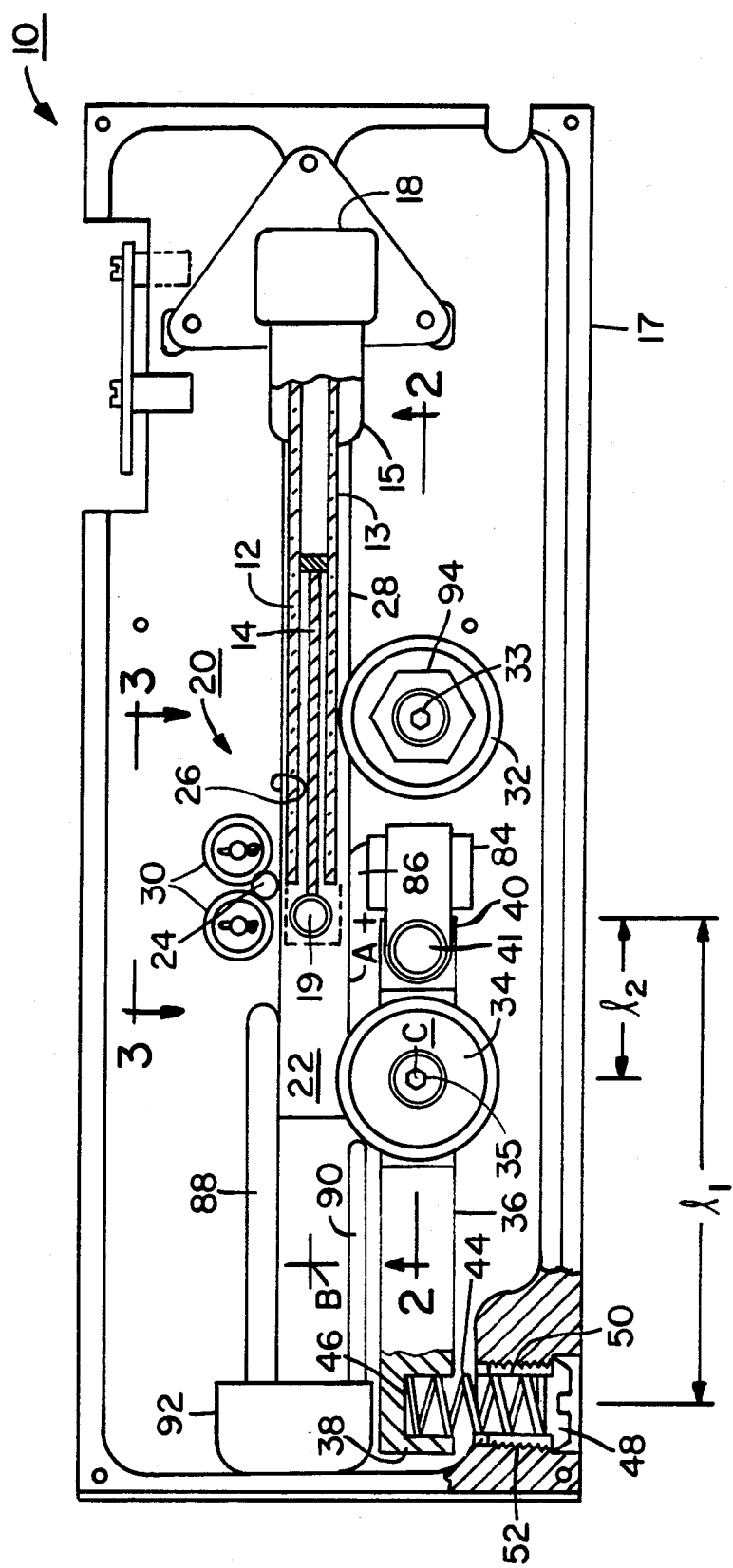
FIG. 1 is a fragmented side view of the friction drive of the present invention illustrating the application of forces to the rack, the pinion, and the guide rollers.
Figure 2:
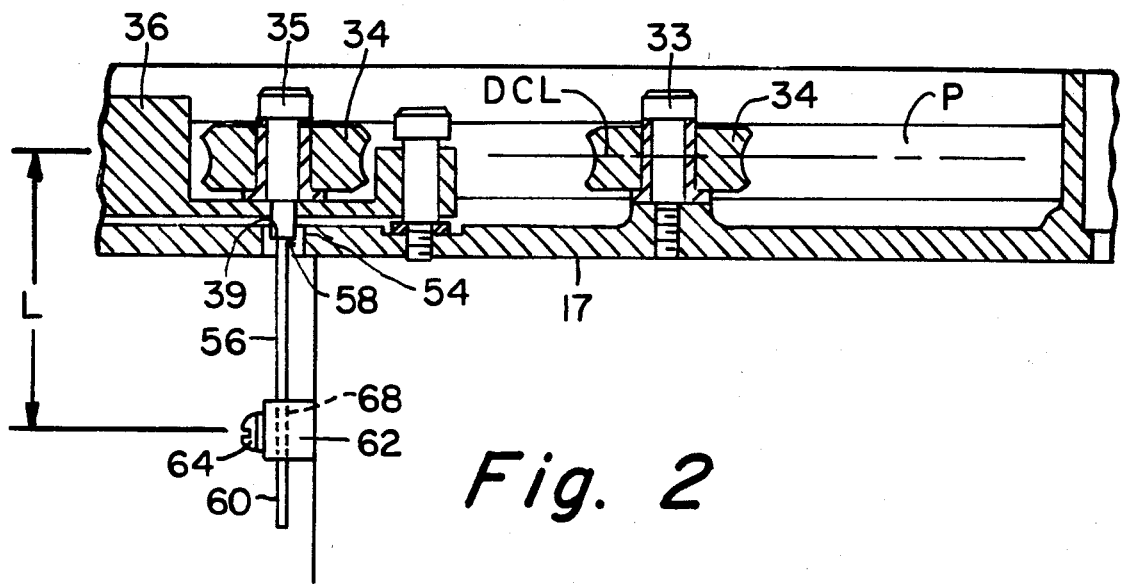
FIG. 2 is a detail of the swing arm and moveable guide roller taken along line 2—2 of FIG. 1 for particularly illustrating means for preventing lateral motion of the swing arm and moveable guide roller.
Figure 3:
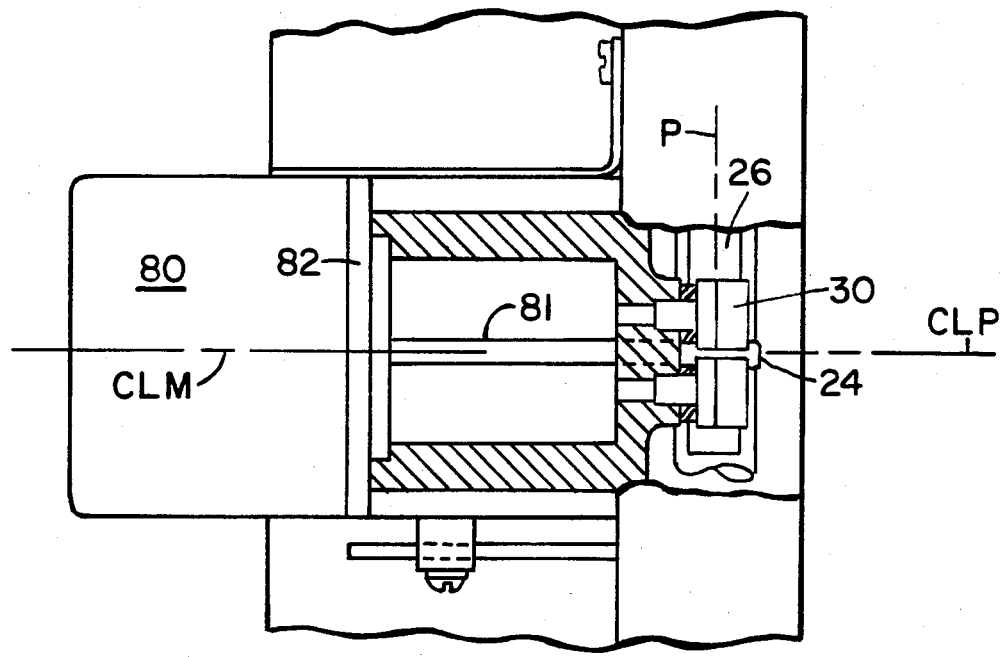
FIG. 3 is a fragmented view taken along line 3—3 of FIG. 1 illustrating the positioning of the stepping motor driving the pinion along a flexible shaft.

Referring now to FIGS. 1, 2 and 3, there is shown a fluid metering system 10 in which a precision syringe 12 has a plunger 14 located therein. The syringe is supported at one end 13 in a connector 15. The plunger 14 is coupled to a drive pin 19. The drive pin 19 is reciprocally moveable between positions A and B by means hereinafter described. The end 13 of the syringe 12, located in the connector 15, is coupled to and is in fluid communication with a known valve 18. The valve 18 may be coupled to various fluid sources (not shown). Said valve 18 may be adapted to selectively open and close internal flow paths therein for allowing one or more of the various fluids to enter the syringe 12 as the plunger 14 is moved downwardly.

FIG. 1 shows details of a drive 20 useful for moving the plunger 14. The drive 20 includes a rack 22 and a pinion 24. The rack 22 is preferably a centerless ground rod having a flat planar side 26 (hereinafter flat 26) and an opposed round portion 28. The pinion 24 engages the flat 26 and is held in position by means of a pair of offset backing rollers 30 suitably mounted in straddling relation with the pinion 24 in a housing 17. The backing rollers 30 may be hardened cam followers of a known kind.

A pair of guide rollers 32 and 34 engage the round portion 28 of the rack in opposition to the flat 26 in straddling relationship with the pinion 24. One of the guide rollers 34 is moveable (sometimes hereafter moveable roller 34), and one of the guide rollers 32 is fixed (sometimes hereinafter fixed roller 32). The fixed roller 32 is mounted on a pin 33 secured in the housing 17. The moveable roller 34 is secured to a swing arm 36 by means of pin 35. The swing arm 36 has a free end 38 and a pinned end 40. The pinned end 40 is secured in the housing 17 by pin 41. In order to take up manufacturing tolerances, guide roller 32 is mounted on pin 33 preferably in conjunction with adjustable eccentric bushing 94. The eccentric bushing 94 causes the bearing of guide roller 32 to move in an eccentric manner upon mounting the guide roller to housing 17. This permits the adjustment of the vertical movement of the rack, vis-a-vis the syringe, such that the rack travels parallel to the longitudinal axis of the syringe.

The pins 33 and 41 are centered along line 2—2, parallel with the flat 26. The moveable roller 34 has its center C radially located from the pin 41. The free end 38 of the swing arm 36 has a seat 46 formed therein for receiving a spring 44. An adjusting screw 48 has a seat 50 therein for receiving an opposite end of the spring 44. The adjusting screw 48 is located in a threaded bore 52 in the housing 17. Rotation of the adjusting screw 48 causes the spring 44 to compress between the seats 46 and 50, thereby urging the free end 38 of the swing arm 36 to move in a clockwise direction. The force exerted by the spring 44 against the swing arm 36 is multiplied by the leverage advantage of the swing arm 36. That is, distance $l_1$, between the pin 41 and the spring 44, is longer than distance $l_2$, between the pin 41 and the center C of the moveable guide roller 34. Any force exerted by the spring 44 is multiplied by the ratio of the longer distance $l_1$ over the shorter distance $l_2$. In one embodiment of the present invention, the leverage factor is about 3.5 to 1.

The fixed roller 32 and the moveable roller 34 secure the rack 22 into intimate contact with the pinion 24. In one embodiment of the present invention, an approximately 20 lb. force exerted by the spring 44 against the swing arm 36 causes a 70 lb. force by the moveable roller 34 against the rack 22 as a result of an approximate leverage factor of 3.5:1. This force is balanced by the fixed guide roller 32, thereby resulting in a total force of about 140 lbs. between the rack 22 and the pinion 24.

The rack 22 and the pinion 24 are preferably manufactured from bearing materials hardened to a Rockwell C60 or over. The coefficient of friction between the rack 22 and the pinion 24 is approximately 0.1. In a preferred embodiment, a frictional force of about 15 lb. between the two elements results. Because the syringe 12 is designed to have an actuating force of about 5 lbs. or less, there is available 10 lbs. of force in excess of that which will cause slippage between the rack 22 and the pinion 24. The slip that does occur between the rack 22 and pinion 24 is small, repeatable, and linear over the range of operation of the metering device 10.

In order to prevent errors caused by relative motion between the various parts of the metering device 10, means has been provided for restricting the motion of the elements where such motion would be detrimental.

In FIG. 2, a positioning rod 56 (sometimes hereinafter rod 56) secures the moveable guide roller 34 laterally so that its diametric centerline DCL lies in a plane P. The plane P is perpendicular to the flat 26 of the rack 22. The rod 56 is coupled at a proximal end 58 to an inboard end 39 of the pin 35 securing the roller 34 to the swing arm 36. A distal end 60 of the rod 56 is secured in a fixture 62 having an adjusting screw 64 therein. The fixture 62 has a slot 68 through which the distal end 60 of the rod 56 fits. The adjusting screw 64 engages the positioning rod 56 for securing it in a fixed lateral direction. The inboard end 39 of the pin 35 and the positioning rod 56 pass through a relatively large opening 54 in the housing 17, as shown. Adjustment of the rod 56 fixes the position of the swing arm 36 (up and down in the page). Forces on the moveable roller 34, tending to move it out of plane p, are counteracted by the fixed rod 56. Although the positioning rod 56 is stressed, there results a very tight configuration of the parts in the plane P.

Lateral motion in the rack, caused by slop in the rollers 32 and 34, can be transmitted to the syringe 12 and can create cyclical errors. The fixed roller 32 and the moveable roller 34 are equipped with preloaded, double row, angular contact bearings. Such bearings are known to be relatively stiff and allow an axial deflection of less than ten thousandths of an inch for 10 lbs. of axial load. Thus, the rollers 32 and 34 help to maintain the rack 22 axially in the plane P.

In FIG. 3, there is shown a known stepping motor 80 (sometimes hereinafter motor 80) having an extended drive shaft 81 about 3" long. The pinion 24 is a hardened free end of the shaft 81. The motor 80 is mounted on a bracket 82 secured in the housing 17. The motor 80 directly drives pinion 24 along the shaft 81. Because the motor 80 is a stepping type device, there may be vibration or chatter introduced into the system if there is not also good alignment of the parts. In the present invention, shaft 81 is flexible and allows for minor misalignment of its centerline CLM near the motor 80 and its centerline CLP near the pinion 24. The remote positioning (about 3") of the motor 30 with respect to the pinion 24 allows the shaft 81 to operate as a flexible drive shaft 81, causing smooth operation of the rack 22 and pinion 24. For example, in FIGS. 1 and 3 it can be seen that the pinion 24 is constrained between the backing rollers 30 and the flat 26 so that the centerline CLP of the pinion 24 is perpendicular to the plane P. If there is any misalignment between the bracket 82 and the motor 80, then the centerline CLM of the shaft 81 near the motor 80 may be misaligned with the centerline CLP near the pinion 24. Such a misalignment would cause harmful vibrations or chatter. By extending the length of shaft 81, as shown, the flexibility introduced into the system dampens out vibrations and enhances accuracy.

The stepping motor 80 may be one of a variety of commerically available units. It may be controlled by an electrical control system (not shown). A preferred control system may be characterized as a pulse width modulation control system. One such system is shown in U.S. Pat. No. 3,564,273. Other stepping motor controls are disclosed in U.S. Pat. Nos. 3,742,329 and 3,812,414. Stepping motor 80 and the preferred control system results in highly accurate motor drive.

In a preferred embodiment, the already low slip observed in the present invention is significantly further reduced through the use of a thixotropic lubricant. Such lubricant typically is applied to rack 22 at flat 26 and round portion 28, those areas of rack 22 which contact pinion 24 and guidr rollers 32 and 34, respectively. As used herein, the term "thixotropic lubricant" means a normally liquid lubricant which becomes at least semi-solid when highly stressed. An example of an especially suitable thixotropic lubricant is SANTOTRAC® (Monsanto Company, St. Louis, Mo.).

Although the thixotropic lubricant may be applied to rack 22 in a variety of ways, a preferred procedure consists of mounting a relay wick 84 on swing arm 36 at pinned end 40 by means of pin 41. Thixotropic lubricant is applied to round portion 28 at a point intermediate guide rollers 32 and 34 by relay wick 84 via wicking material 86. Additional wicking materials 88 and 90 containing thixotropic lubricant contact flat 26 below offset backing rollers 30 and pinion 24 and round portion 28 below guide roller 34, respectively. Wicking materials 88 and 90 may terminate at their lower ends in cup 92 which acts as a reservoir for the thixotropic lubricant and also prevents the lubricant from leaking into other areas of the friction drive.

Wicking materials 86, 88, and 90 preferably are non-linting and most preferably are a porous synthetic foam.

It is to be understood that the foregoing detailed description is given merely by way of illustration and that many variations may be made therein without departing from the spirit and scope of the present invention.

We claim:

1. In a fluid metering system, wherein a plunger actuated syringe is mounted in a housing and is coupled to at least one source of fluid, a highly accurate and precise linear friction drive mounted in the housing and coupled to the plunger comprising: a rack, having a flat side; a rotatable pinion pressed against the flat side of the rack for moving the rack by friction; opposed guide rollers, one of which is fixed relative to the housing, engaging a portion of the rack opposite the flat side in straddling relation with the pinion for urging the rack intimately thereagainst; a moveable swing arm having one end mounted for rotatable motion about a point and moveably supporting the other of the guide rollers against the rack; a force exerting means operating at a free end of the swing arm for leveraging the guide roller carried by the swing arm against the rack and transmitting the force to the pinion; and means for securing the swing arm in a plane perpendicular to the flat side of the rack, preventing lateral motion of the swing arm from being transmitted to the rack and pinion, for suppressing cyclical variation in the relative motion between the same.

2. The fluid metering system of claim 1, wherein the means for exerting force against the free end of the swing arm comprises a spring secured between the free end of the swing arm and the housing.

3. The fluid metering system as set forth in claim 1, wherein the rack and pinion experience negligible linear slip of one relative to the other.

4. The fluid metering system as set forth in claim 1, including means for driving the pinion comprising: a stepping motor having an elongated shaft extending therefrom, a free end of which forms the pinion, said elongated shaft forming a flexible drive between the motor and the pinion for suppressing or damping chatter and vibration between the rack and pinion.

5. The fluid metering system as set forth in claim 1, including backing roller means in straddling relationship with the pinion and offset from the rack for securing the pinion in intimate rolling relationship with the rack.

6. The fluid metering system as set forth in claim 5, wherein the backing roller means for securing the pinion relative to the rack comprise hardened rotatable cam follower bearings.

7. The fluid metering system as set forth in claim 1, wherein the guide rollers are formed of preloaded, double row, angular contact bearings inhibiting lateral motion thereof with respect to the rack to thereby cyclical motion of the rack and pinion.

8. The fluid metering system as set forth in claim 1, wherein the means for securing the moveable guide roller in the plane comprises: a rod having a distal end fixed with respect to the housing and a proximal end fixed with respect to the swing arm, and means coupled to the rod for adjusting the lateral position of the distal end thereof for securely locating the swing arm with respect to the housing.

9. The fluid metering system as set forth in claim 1, wherein the rack and pinion are hardened to at least a Rockwell C60.

10. An accurate and precise linear friction drive comprising: a housing; a rack, having a flat side; a rotatable pinion pressed against the flat side of the rack for moving the rack by friction; opposed guide rollers, one of which is fixed relative to the housing, engaging a portion of the rack opposite the flat side in straddling relation with the pinion for urging the rack intimately thereagainst; a moveable swing arm having one end mounted for rotatable motion about a point and moveably supporting the other of the guide rollers against the rack; a force exerting means operating at a free end of the swing arm for leveraging the guide roller carried by the swing arm against the rack and transmitting the force to the pinion; and means for securing the swing arm in a plane perpendicular to the flat side of the rack, preventing lateral motion of the swing arm from being transmitted to the rack and pinion, for suppressing cyclical variation in the relative motion between the same.

11. The linear friction drive of claim 10, wherein the means for exerting force against the free end of the swing arm comprises a spring secured between the free end of the swing arm and the housing.

12. The linear friction drive of claim 10, including means for driving the pinion comprising: a stepping motor having an elongated shaft extending therefrom, a free end of which forms the pinion, said elongated shaft forming a flexible drive between the motor and the pinion for suppressing or damping chatter and vibration between the rack and pinion.

13. The linear friction drive of claim 10, including backing roller means in straddling relationship with the pinion and offset from the rack for securing the pinion in intimate rolling relationship with the rack.

14. The linear friction drive of claim 10, wherein the means for securing the moveable guide roller in the plane comprises: a rod having a distal end fixed with respect to the housing and a proximal end fixed with respect to the swing arm, and means coupled to the rod for adjusting the lateral position of the distal end thereof for securely locating the swing arm with respect to the housing.

* * * * *